Feb. 4, 1969   J. G. KUHN ET AL   3,425,768
SCANNING DEVICE HAVING OPTICAL DEROTATION MEANS THEREIN
Filed Aug. 1, 1966

Robert M. Tally,
Jackson G. Kuhn,
INVENTORS.
BY

ATTORNEY.

Robert M. Tally,
Jackson G. Kuhn,
INVENTORS.

BY

ATTORNEY.

3,425,768
SCANNING DEVICE HAVING OPTICAL DEROTATION MEANS THEREIN
Jackson G. Kuhn and Robert M. Talley, Santa Barbara, Calif., assignors to Santa Barbara Research Center, Goleta, Calif., a corporation of California
Filed Aug. 1, 1966, Ser. No. 569,169
U.S. Cl. 350—7        3 Claims
Int. Cl. G02b 17/08

ABSTRACT OF THE DISCLOSURE

A scanning mechanism wherein an optical derotator therein comprises a plurality of stacked identically configured wave transmitting strips.

---

The invention relates to scanning devices generally and particularly to an optical scanner incorporating a unique optical derotator within the optical system and to the optical derotator per se.

A characteristic of scanning systems used to view large areas is that the optical system introduce image rotation either at the viewing eyepiece or the detecting device, which ever constitutes the focus point of the scanning arrangement. The problem presented with image rotation in conventional scanning systems is that the detector, whether it be a viewing human operator or a sensitive detector, is not presented with a true picture of the object viewed.

Heretofore, opto-mechanical systems employing reflecting mirrors have been used to permit both elevation and azimuth scanning. In such typical mirror systems, in order to prevent image rotation, a plurality of at least three reflecting surfaces must be introduced into the optical path to provide image derotation. A "K" mirror is a typical example. The mirror-optical system, in addition to occupying a great deal of space, is reflective only, i.e., has no refractive characteristics.

Another prior art system, i.e., a refractive system, employed what is known in the art as a "Dove" prism. This prism may be used with collimated light and effectively accomplishes image derotation in its optical system. The Dove prisms heretofore used, however, have been relatively transmissively inefficient because of their size. Such prisms have proved to be expensive and too large for most useful applications.

"Pechan" prisms have also been used to correct image rotation but have not been universally applied because they will not accept rays of light at an inclined angle more than 6° and total internal reflection must occur to offer satisfactory operation. Again, the Pechan prism, like the Dove prism, has proved to be inefficient because of the relatively long light path through which the beam must pass.

Other practical disadvantages of the prior art mirror, Dove or Pechan prism arrangements were the relatively large sizes required and careful manufacture in order to avoid image distortion. All of these requirements, of course, contributed to a high initial cost and occupied valuable space in the in-service device.

Accordingly, it is a primary object of the invention to provide an optical derotating structure readily adaptable to conventional scanning devices which efficiently and effectively compensate for image rotation during the scanning operation.

It is a further object of the invention to provide an optical arrangement associated with a scanning device that will have less weight and require less physical space than prior art structures.

It is yet another object of the invention to provide an arrangement of the type described that is achromatic and avoids the introduction of color dispersion.

It is yet another object of the invention to provide a derotation arrangement as described that provides a relatively short light path and thus offers maximum efficiency from the standpoint of beam transmission.

Yet another object of the invention is to provide a derotation mode in combination with the hemispheric scanning device which does not introduce image distortion and therefore accurately reflects the viewed scene.

These and other objects of the invention will become apparent in the course of the following description and from an examination of the related drawings wherein.

Figure 1:
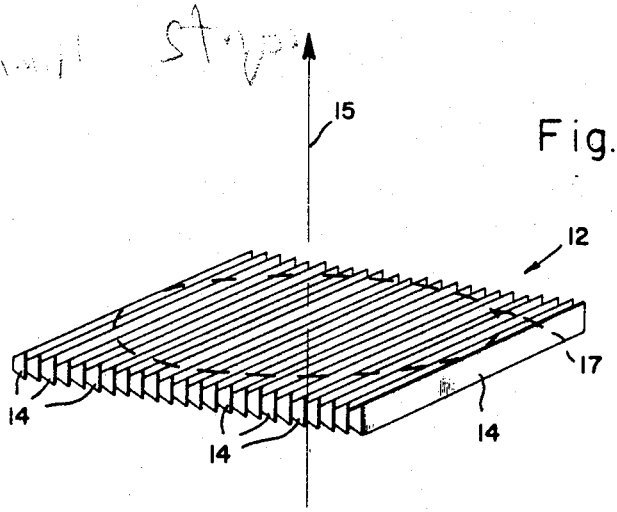
FIGURE 1 is a perspective view of a preferred derotation assembly.
Figure 2:
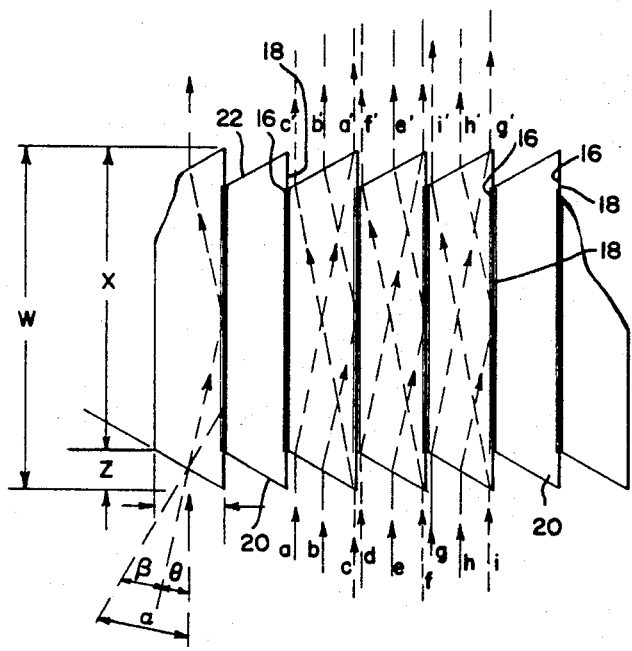
FIG. 2 is a fragmentary side-elevational view of the structure of FIG. 1 serving to illustrate the operation of the structure.

Describing the invention in detail and directing attention to FIGS. 1 and 2, a derotation assembly is indicated generally at 12 and comprises a plurality of elongated beam-transparent, identically-formed segments 14, 14. Its optical axis is indicated at 15. When viewed in the end-elevational view of FIG. 2, each segment 14 is of truncated triangular form and is axially elongated as is shown in FIG. 1 to provide a plurality of identically formed, elongated beam, transparent strips. As is shown in FIG. 2, the larger or base surface 16 of each strip 14 is appropriately coated, such as by aluminizing, to provide an internally reflecting mirror surface. Additionally, a blackening surface may be placed as at 18 over the aluminized coating 16 to aid in absorbing scattered light and thereby improve the efficiency of the arrangement as will hereinafter be explained. The strips 14, 14 are sandwiched together within substantially a single plane and may be appropriately cemented to provide a cohesive unit. If desired, the strips 14 may be held together by an appropriate frame.

FIG. 2 illustrates the operation of the derotation assembly when it is placed within a beam of collimated light or other collimated wave in any design spectral region. The letters $a$ through $i$, inclusive, are illustrative of the entering beam, and the letters $a'$ through $i'$, inclusive, are illustrative of the existing beam. Typically, the beams enter each strip 14 in the surfaces 20, 20, and are refracted toward the mirror surface 16, reflected therefrom toward the existing surface 22, 22, and again refracted in the existing surfaces into a parallel collimated beam. However, the image that the beam evidences is reversed when passing through each segment 14. It must be remembered that the strips 14 may be made of any material depending upon design criteria of the particular service use. The strips, however, must be transparent to the waves of the particular spectral bond being transmitted.

In order to provide the most efficient arrangement, the proper bevel on the surfaces 20 and 22 must be provided and an appropriate ratio maintained between the thickness $t$ and the total width $w$ of each strip 14. Without an appropriate dimensioning, a considerable portion of the received light beam may be lost on the wave absorbing surfaces 18, 18.

The relationship, therefore, between the angle of bevel, the thickness and width of each strip, is directly related to the index of refraction of the particular material employed and the following analysis is illustrative of the mode of determining the relationships.

Assuming transmission of infrared waves in, for example, the 2 to 16 micron range and that each strip 14 will be made of germanium, an index of refraction $n=4.00$ is thus determined. For manufacturing convenience a strip thickness $t=0.10$ inch and a bevel of surfaces 20 and 22 of 30.0° may be used. The following design formulas apply:

(1) $\quad \sin \alpha = n \sin \beta$
(2) $\quad \theta = \alpha - \beta$
(3) $\quad w = x + z$
(4) $\quad x = \dfrac{t}{\tan \theta}$
(5) $z = t \tan \alpha$ From (1)

$$\sin \beta = \frac{\sin \alpha}{n} = \frac{\sin 30.0°}{4.00} = 0.1250 \beta = 7.2°$$

From (2) $\theta = \alpha - \beta = 30.0° - 7.2° = 22.8°$ $\tan \theta = 0.4204$
From (4)

$$x = \frac{t}{\tan \theta} = \frac{0.10}{0.4204} = 0.2378 \text{ inch}$$

From (5) $z = t \tan \alpha = 0.10$
$\times \tan 30° = 0.10 \times 0.5774 = 0.5774$ inch.
From (3) $w = x + z = 0.2378 + 0.5774 = 0.2955$ inch Therefore the calculated derotation assembly providing a 3.00 inch diameter aperture would involve only 30 strips 14, each 0.10 inch thick and 3.00 inches long. Unused corners, of course, could be removed as shown by dotted line 17 in FIG. 1. The relatively small and convenient size of such an assembly as compared to prior art derotation structures will readily be apparent to those familiar with this field.

Figure 2A:
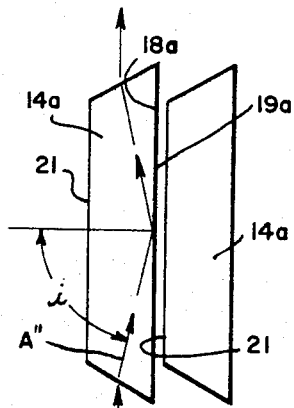
FIG. 2A is a fragmentary view similar to FIG. 2, illustrating a modification of the structure that may be employed.

A slightly altered structure is shown in FIG. 2A. The strips 14a are positioned so that a small space 15 exists therebetween. The space 15 should be greater than a wavelength of the beam being transmitted. If the angle $i$ is greater than the critical angle for the material used in the strip 14a then the refracted beam A″ will reflect from surface 18a without having aluminizing reflective material covering surface 19a. If the angle $i$ were less than the critical angle, the beam A″ would pass from surface 19 and be lost in space. If this mode of obtaining desired light beam transmission and reflection is used it would be desirable to coat each surface 21 with a light absorbent material, e.g., blackening agent to trap scattered light.

Figure 3:
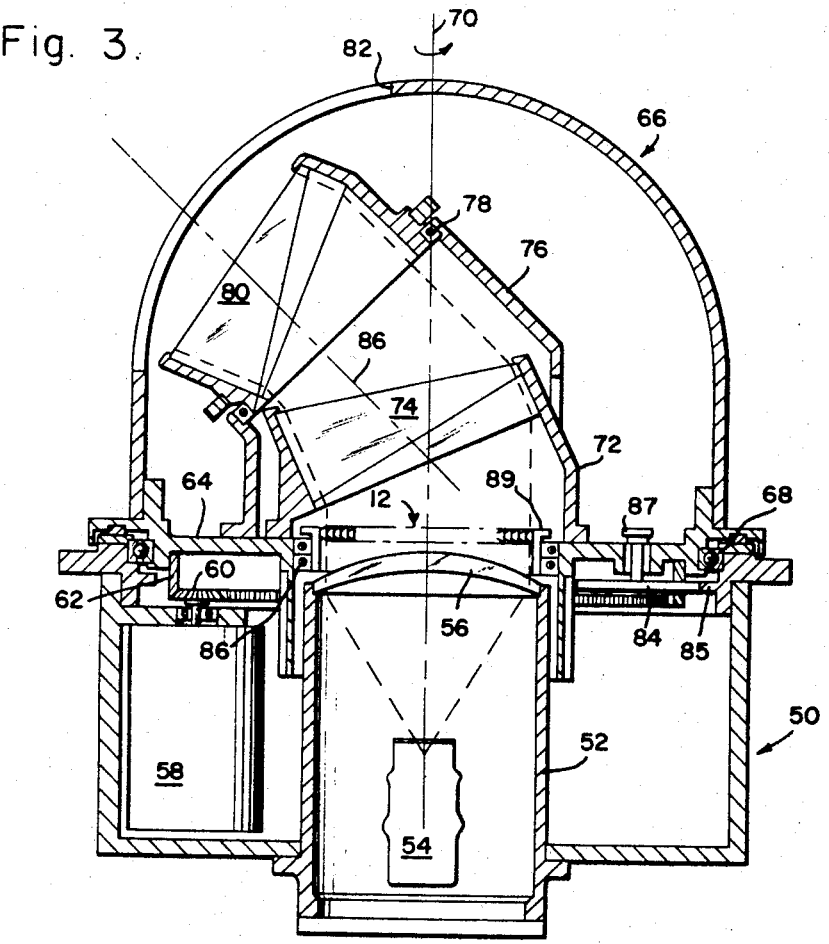
FIG. 3 is a central, vertical, sectional view, partly in elevation, of the derotation structure in combination with a typical scanning mechanism.

Directing attention to FIG. 3, a typical hemispherical scanning device, numeral 50 indicates a fixed base which may be mounted on an appropriate carrying vehicle such as an aircraft or the like. The base 50 may be provided with a central telescope 52 having a conventional detector such as an infrared detector 54 carried therein. At the upper aspect of scope 52 a lens 56 is provided which focuses any received beam on the detector 54. Base 50 also carries a conventional drive motor 58, the latter having a driving gear 60 engaging a driven ring gear 62 depending from and secured to a plate 64 of a scanning head 66. The scanning head 66 is bearing mounted as at 68 to the base 50 and is therefore free to rotate about the vertical axis 70 of the arrangement as indicated. The motor 58, of course, conventionally drives the scanning head 66.

The plate 64 supports a first upwardly directed tube 72 which carries a prism 74 for rotation with head 66. The plate 64 also carries an upwardly directed tube 76 which in turn supports, at bearings 78, a second prism 80. The prism 80 is optically aligned with an opening 82 within the scanning head 66 and an independent driving arrangement (not shown) at gears 84 which engage track 85 is provided to rotate prism 80 about axis 86. The axis 86 is inclined 45° to the vertical axis 70 of the entire arrangement.

The derotation assembly 12, as described with reference to FIGS. 1 and 2, is carried by the housing 50 via bearings 86 immediately above lens 56 of telescope 52.

Conventional drive gearing (not shown) may interconnect driving gear 87 and derotation assembly flange 89 to induce rotation of the latter. It will thus be understood that the assembly 12 is rotated in the same direction about axis 70 as the scanning head 66 and at an angular velocity equal to one-half the angular velocity of the rotating scanning head 66.

In operation, it will be understood that the prisms 80, 74, derotating arrangement 12, and lens 56 are an optical series path. That is, collimated light received by prism 80 is deflected to the receiving surface of prism 74. Again, prism 74 deflects the collimated light and the latter impinges upon the upper surface of the derotation assembly 12. It will be understood while the light beam is being transmitted, prism 80 is rotating about axis 86 and concurrently prism 74 is being rotated with the scanning head 66 about axis 70. Thus an entire hemisphere is scanned and the scanning motion is effective to introduce a rotation of the images actually being scanned.

The rotated image, however, falls on the surface of derotation assembly 12 and is reversed or, in effect, derotated during the scanning operation. Thus, a correct image of the object being scanned is conveyed to the lens 56 and to the detector 54.

The combination described incorporating the novel derotation assembly patently uses minimum space in the optical system, provides a line path for beam transmission therethrough that is relatively short and is therefore highly efficient, that is, little lost beam energy within the derotation assembly. Additionally, space and weight requirements are obviously small as compared to prior art systems which reduces initial cost and is attractive especially in those applications where the scanner is to be mounted on an orbital satellite. The structure shown is achromatic and does not introduce errors in the optical systems resulting from color dispersion.

The invention as shown is by way of illustration and not limitation and may be modified in many particulars all within the scope of the appended claims.

What is claimed is:
1. In a scanning mechanism,
a deflector in acute angular relation to the direction of propagation of a wave being scanned,
means to move the deflector through a scanning area,
a focusing point having a wave receiver there located,
means in series with the deflector to convey to and focus the deflected wave at the point,
said last mentioned means including a plurality of identically configured wave transmitting strips,
said strips being positioned with surfaces adjacent each other and having wave entrance edges and wave exit edges on opposed sides thereof as seen in transverse sectional view,
the edges having a shorter dimension than the surfaces as seen in said sectional view,
said edges being beveled in relation to said surface as seen in said transverse sectional view so that each edge falls within an independent plane,
all of said edges facing in the same direction,
certain of said surfaces being arranged to reflect the refracted waves from the entrance edge to the exit edge, said strips being arranged to rotatably move in determined relation to the motion of the deflector through said scanning area whereby the orientation of the waves passing through the strips is identically reversed.

2. A scanning mechanism according to claim 1, and including a reflective coating applied to one of said adjacent surfaces and a wave absorbing coating applied to the other of said adjacent surfaces.

3. A scanning mechanism according to claim 1, wherein the surfaces of said strips are slightly spaced from each other, said space being greater than the wavelength of the light being transmitted.

References Cited

UNITED STATES PATENTS

| 622,506 | 3/1899 | Manning | 350—262 X |
|---|---|---|---|
| 2,154,686 | 4/1939 | Logan | 350—262 X |
| 2,457,543 | 12/1948 | Goldsmith et al. | 350—24 |
| 2,597,001 | 5/1952 | Jaffe | 88—1 |
| 3,023,662 | 3/1962 | Hicks | 350—7 |
| 3,193,682 | 7/1965 | Weiss | 350—7 X |
| 3,204,523 | 9/1965 | Daily | 350—26 X |
| 2,928,952 | 3/1960 | Bednarz | 350—7 X |
| 2,602,385 | 7/1952 | Bonnet | 350—203 |
| 2,942,514 | 6/1960 | Brandon | 350—7 |

DAVID SCHONBERG, *Primary Examiner.*

P. R. GILLIAM, *Assistant Examiner.*

U.S. Cl. X.R.

350—203, 287, 262

UNITED STATES PATENT OFFICE
CERTIFICATE OF CORRECTION

Patent No. 3,425,768 February 4, 1969

Jackson G. Kuhn et al.

It is certified that error appears in the above identified patent and that said Letters Patent are hereby corrected as shown below:

Column 2, line 45, "aluminnized" should read -- aluminized --; lines 57, 60 and 61, "existing", each occurrence, should read -- exiting --. Column 4, line 50, "systems" should read -- system --.

Signed and sealed this 14th day of April 1970.

(SEAL)
Attest:

Edward M. Fletcher, Jr.

Attesting Officer

WILLIAM E. SCHUYLER, JR.

Commissioner of Patents